United States Patent [19]
Defraites, Jr.

[11] Patent Number: 5,624,502
[45] Date of Patent: Apr. 29, 1997

[54] METHOD OF CLEANING BOATS THAT HAVE BEEN CONTAMINATED WITH OIL AND GAS WELL DRILLING FLUIDS AND HAZARDOUS WASTE

[76] Inventor: Arthur A. Defraites, Jr., 300 Buena Vista Blvd., Houma, La. 70360

[21] Appl. No.: 548,143

[22] Filed: Oct. 25, 1995

[51] Int. Cl.$^6$ ...................................................... B08B 7/04
[52] U.S. Cl. ........................... 134/10; 134/13; 210/805; 210/195.1
[58] Field of Search ....................... 134/10, 13; 210/805, 210/806, 194, 195.1, 721, 726, 765

[56] References Cited

U.S. PATENT DOCUMENTS

| | | |
|---|---|---|
| 3,920,550 | 11/1975 | Farrell, Jr. et al. |
| 4,175,039 | 11/1979 | Fisher .................. 134/10 |
| 4,219,418 | 8/1980 | Pilon . |
| 4,221,661 | 9/1980 | Shimizu et al. |
| 4,507,208 | 3/1985 | Simon et al. |
| 4,834,889 | 5/1989 | Schleiffarth . |
| 5,051,191 | 9/1991 | Rasmussen et al. |
| 5,114,578 | 5/1992 | Sundstrom . |
| 5,132,025 | 7/1992 | Hays . |
| 5,199,997 | 4/1993 | Stowe .................. 134/10 |
| 5,330,636 | 7/1994 | Reichert . |
| 5,374,352 | 12/1994 | Pattee . |

OTHER PUBLICATIONS

*World's Oil 1994*, Jun., 1994.

Primary Examiner—Jeffrey Snay
Attorney, Agent, or Firm—Pravel, Hewitt, Kimball & Krieger

[57] ABSTRACT

A system for cleaning vessels that have been contaminated with oil field drilling and production waste materials such as oil well drilling fluid or hazardous waste using recycled wash water. As dirty wash water accumulates in a vessel during cleaning, it is transferred to a settlement section of the waste receiving barge. A cationic polymer is injected into the suction side of a waste water pump during transfer of dirty fluid from the vessel to the receiving barge. The polymers react with fluids to begin an initial settling process within the waste receiving barge. Decant water is subjected to secondary settlement and secondary chemical treatment after it leaves the primary settling section of the waste receiving barge. The laundered water is returned to the wash water storage facility for reusing and cleaning the same vessel or additional vessels. In this fashion, waste is continuously concentrated in the receiving vessel for ultimate disposal at a remote site and wash water is recycled for reuse.

6 Claims, 2 Drawing Sheets

METHOD OF CLEANING BOATS THAT HAVE BEEN CONTAMINATED WITH OIL AND GAS WELL DRILLING FLUIDS AND HAZARDOUS WASTE

BACKGROUND OF THE INVENTION

1. Field of the Invention

The present invention relates to the cleaning of boat tanks, bilges, and holds; barges; mobile or land based tanks: cutting boxes or container; and related vessels (sometimes hereinafter referred to as "vessels") that have been contaminated with oil and gas well drilling fluids such as oil well drilling mud and the like or with hazardous waste. More particularly, the present invention relates to a method and apparatus for the cleaning (in a marine and land based environment) of vessels that have been contaminated with oil and gas well drilling fluids, wherein a recycling water recovery system reuses the same wash water over and over, while continuously concentrating solid material in a receiving barge after the wash water leaves the vessel being cleaned and carrying oil and gas well drilling fluid waste products therewith (including solid material), and wherein various treatment stations remove solid material, oil, and like pollutants from the wash water stream before it is recycled to clean the vessel a second time or to clean a second vessel or a third vessel, etc.

2. General Background

In the drilling of oil and gas wells, there are a number of fluids that are used in the drilling process. These fluids include for example drilling mud that contains heavy solids. This drilling mud becomes a pollutant when it is placed in a vessel that is used to transport drilling mud from land to oil and gas well and drilling production platforms located offshore.

Other oil and gas well drilling, completion and work over fluids include non-dispersed drilling mud, dispersed drilling mud, calcium treated drilling mud, drilling mud incorporating polymers, drilling muds prepared from fresh or brine water and sodium chloride, oil-based drilling mud and synthetic drilling mud. Other fluids used in the drilling of oil and gas wells include bactericides, calcium removers, corrosion inhibitors, defoamers, emulsifiers, filtrate reducers, flocculants, foaming agents, lost circulation materials, lubricants, pipe-freeing agents, shale control inhibitors, and surface active agents. A discussion of the various types of drilling, completion and workover fluids used in the oil and gas well drilling industry can be seen in the June 1994 issue of "World Oil".

Additionally, drilling fluids not used downhole in the drilling process or discarded hydrocarbon based waste fluids that have to be transported back to land are considered hazardous waste as defined by the United States Environmental Protection Agency.

The present method of cleaning such oil and gas well drilling fluids and hazardous waste from vessels is to simply wash the vessel while capturing the wash water in a barge. The wash water becomes contaminated with the oil and gas well drilling fluids and hazardous waste. The barge must then be shipped to a disposal site wherein the contaminated wash water is disposed of.

The disposal of a barge filled with wash water from such a vessel cleaning operation is an expensive and time consuming procedure. Each barge contains thousands of gallons of contaminated wash water and may have to be transported with a tug vessel to a disposal site.

SUMMARY OF THE INVENTION

The present invention solves these problems and short comings of the prior art by using the barge that typically collects all of the waste water as a vessel for concentrating solid material in a recycling process that allows the wash water to be used again and again. With the method of the present invention, various treatment stations remove solid material and oil from the wash water stream after a vessel has been cleaned. Indeed, with the method of the present invention the receiving barge that functions as the first station of the treatment process will eventually be shipped to a disposal site.

Treatment stations that are positioned down stream of the receiving barge also treat the wash water before it can be recycled for cleaning a vessel. At each of these stations, any waste material or hazardous waste that is removed from the wash water stream is transmitted to the receiving barge, again concentrating waste material for eventual disposal.

With the method of the present invention, multiple of the treatment stations can be land based and connected via pipe lines or like flow lines with the receiving barge which is typically floating adjacent the vessel to be cleaned. Further, the wash water storage facility is preferably land based although it could also be a barge or a barge mounted tank. This wash water storage facility contains an initial volume of wash water that is to be used in the cleaning of boats and receives treated wash water after it has been transmitted from the vessel to be cleaned to the receiving barge and then to the various treatment stations down stream of the treatment stations.

The method of the present invention thus provides an improved method and apparatus for cleaning vessels and the like that have been contaminated with oil and gas well drilling fluids such as drilling mud and hazardous waste.

The present invention first provides a laundered wash water storage facility for containing water to be used in cleaning of the boats. The boat is then cleaned with wash water from the storage facility. After the boat has been cleaned, contaminated wash water is then transmitted from the boat to a receiving barge that is floating adjacent the vessel to be cleaned. When wash water is transmitted from the vessel to be cleaned to the receiving barge, a cationic polymer is introduced into the wash water in a fluid line that extends between the vessel and the receiving barge.

Some solid material is settled and concentrated within the receiving barge. Supernatant wash water is decanted from the water surface area of the receiving vessel after the settling of some solid material within the receiving barge.

A cationic flocculent is introduced into the decant supernatant wash water in a flow line that extends between the receiving barge and a settling tank positioned downstream of the vessel and the receiving barge.

Additional solid material is removed from the wash water in a secondary settling tank. The solid material collected within the settling tank is transmitted to the receiving barge to further concentrate the solid material contained within the receiving vessel.

Wash water is transmitted from the settling tank to an aeration tank wherein the wash water is aerated to oxidize waste material contained within the wash water.

The wash water is then returned to the original water storage facility, by transmitting the now laundered wash water from the aeration tank to the water storage facility.

This laundered, recycled wash water can again be used to clean a vessel (i.e. the same vessel or a another vessel) that is contaminated with oil and gas well drilling fluids or hazardous waste.

By using the method of the present invention, the receiving barge can be used to continuously concentrate the true waste material i.e. solids and oil and gas well drilling fluid waste product in the receiving barge for disposal. The method of the present invention eliminates the problem of "bulk" contaminated wash water being necessarily transported via barge for disposal at a remote site. Thus, with the present invention, many vessels can be washed using the same receiving barge for accumulating and concentrating waste material.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
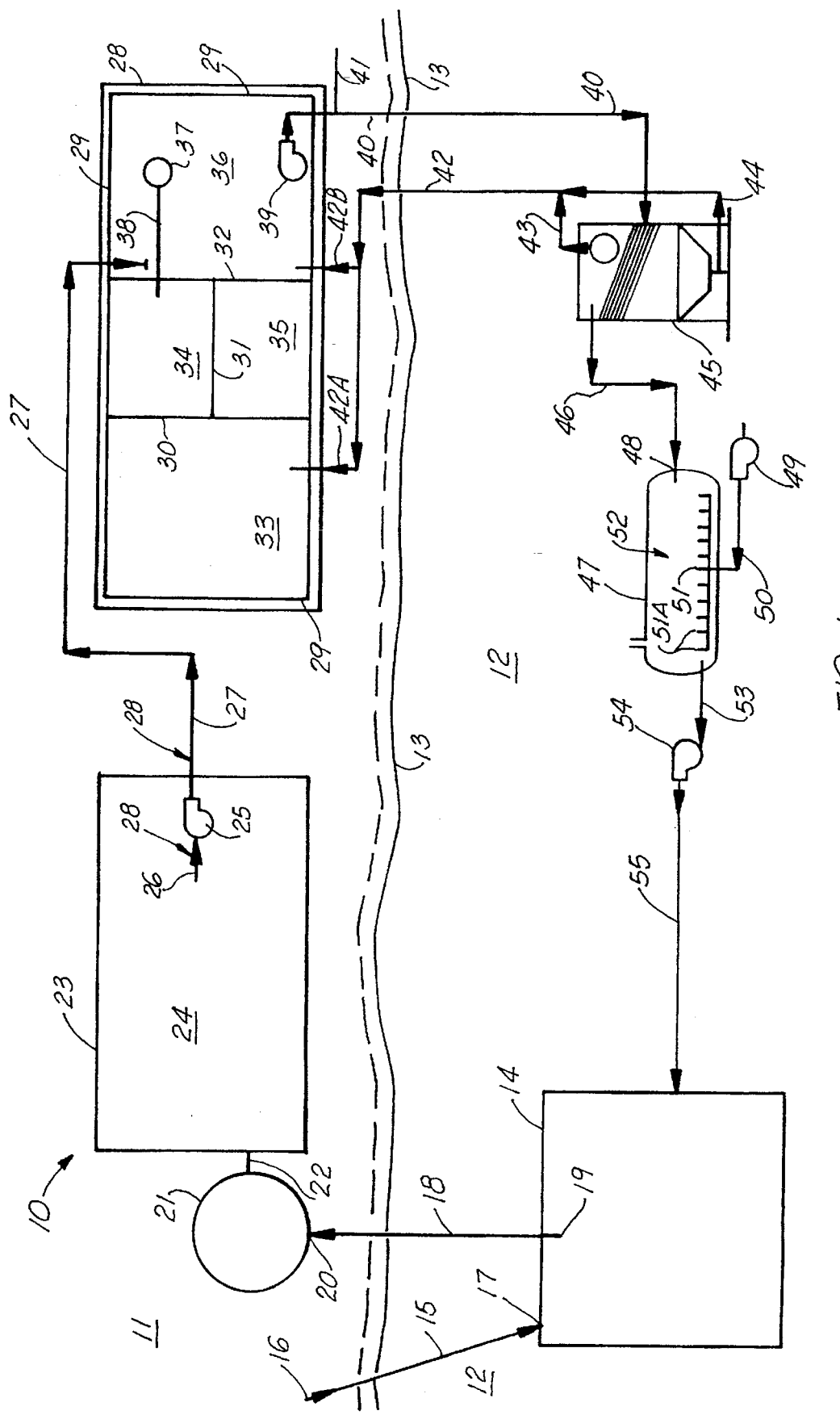
FIG. 1 is a plan view of the preferred embodiment of the apparatus of the present invention.

FIG. 1 illustrates in plan view the preferred embodiment of the apparatus of the present invention designated generally by the numeral 10. FIG. 1 also illustrates the method of the present invention that is used to treat wash water to be used to clean a vessel or a plurality of boats, barges, or like vessels. In FIG. 1, the body of water 11 is shown having a shoreline 13 separating the body of water 11 from land 12. In this environment, the wash water storage facility 14 can be located on land 12 adjacent shoreline 13. In this fashion, a vessel 23 to be cleaned, can be positioned at the shoreline 13 or on the land 12 and at close proximity to the wash water storage facility 14.

A flowline 15 extends from wash water storage facility 14 to the body of water 11. Flowline 15 has an intake 16 and a discharge 17. The flowline 15 can be used to replenish the wash water storage facility as needed to maintain a desired volume of water. The flowline 15 can intake make up water to compensate for any water that remains in the receiving barge in the cleaning operation or to enhance the wash water through dilution.

A flowline 18 extends from wash water storage facility 14 to pumping station 21. The flowline 18 has an intake 19 and a discharge 20. Pumping station 21 communicates with the vessel 23 to be cleaned using discharge line 22. The discharge line 22 can for example be a pipe or flexible hose having a nozzle or other cleaning head for cleaning. Oil field vessel carry drilling fluids or hazardous waste and the deck area 24 is often contaminated with such oil and gas well drilling fluids such as drilling mud or hazardous waste for example.

A pump 25 is used to transmit contaminated wash water from vessel 23 to receiving barge 28. Pump 25 has a suction line 26 for intaking water that has been contaminated. The pump 25 is connected to a discharge line 27 for transmitting contaminated water from pump 25 to section 36 of receiving barge 28. The water recovery and treatment process of the present invention begins with a collection of the wash water that is introduced into receiving barge 28 using pump 25 and discharge line 27.

This contaminated wash water has been used on vessel 23 to clean and wash down any boat tanks, holds, bilges, barges cutting boxes or containers, and any related waste contaminated portion of the vessel. The vessel 23 can be a boat, barge, work boat, crew boat, mobile or land based tanks, cutting boxes, containers or the like. Such vessels are known in the art for transporting drilling products between shore and offshore oil and gas well drilling platforms and production platforms.

As the contaminated wash water accumulates in the vessel being cleaned, it is transferred via lines 26, 27 to a settlement section 36 of the waste water receiving barge 28 using pump 25.

A primary coagulation cationic polymer is injected into the suction side of the waste water pump 25. However, the primary coagulation cationic polymer can be discharged to the downstream or discharge side of the waste water pump 25 if desired. In FIG. 1, arrow 27A designates an introduction of a primary coagulation cationic polymer into the flowlines 26, 27 that are used to transmit contaminated water from vessel 23 to receiving barge 28.

The receiving barge 28 includes an outer vessel wall 29 and a plurality of inner walls 30–32. As shown in FIG. 1, the inner walls 30–32 divide the barge interior into a plurality of self-contained compartments 33–36. The compartment 36 defines a primary settling zone or settlement section for removing solid material that is contained in the contaminated wash water transmitted from boat 23 to receiving barge 28 via flowline 27.

One of the advantages of the system of the present invention is that the receiving barge 28 continuously accumulates and concentrates solid waste material and floating waste material such as oil. With the method of the present invention, this is accomplished by continuously decanting only the uppermost water surface area of clean water contained in the receiving barge 28 and transmitting that decant water downstream for further treatment. Any oil or other floating waste is transmitted from section 36 of receiving barge 28 to one of the other sections 33–35 using skimmer 37 and its discharge line 38. The remaining solid material that is settled in settlement section 36 remains in that section 36 or can be transferred to one of the other sections 33–35 depending upon how much solid material has already been accumulated in the sections 33–35. Ideally, each of the sections 33–36 will be completely filled with solid or floating waste material using method of the present invention. The user continuously balances the amount of solid and floating waste material in each section 33–36 until the receiving barge is completely filled. Pump 39 skims only the very uppermost water layer contained in this section 36. Supernatant water or decant water is removed using pump 39 and pumped to treatment vessel 45. Water leaving receiving barge 28 section 36 is pumped via pump 39 and flowline 40 to settling tank 45.

In FIG. 1, the flowline 41 indicates a second point of chemical injection, namely the injection of a cationic flocculent. The pump 39 preferably has a floating suction pickup that is placed at an approximate depth of about six to twelve inches (6"–12") into the uppermost decant zone of section 36.

A cationic flocculent is injected at flowline 41 into the suction side of the transfer line which begins the secondary phase of the settling process. Oil skimmer 37 is used in the settlement section 36 of waste receiving barge 28 to collect any floating free product or emulsified oil that rises to the surface. These floating waste products are transferred to one of the waste concentration segments 33–35 of receiving barge 28.

Figure 2:
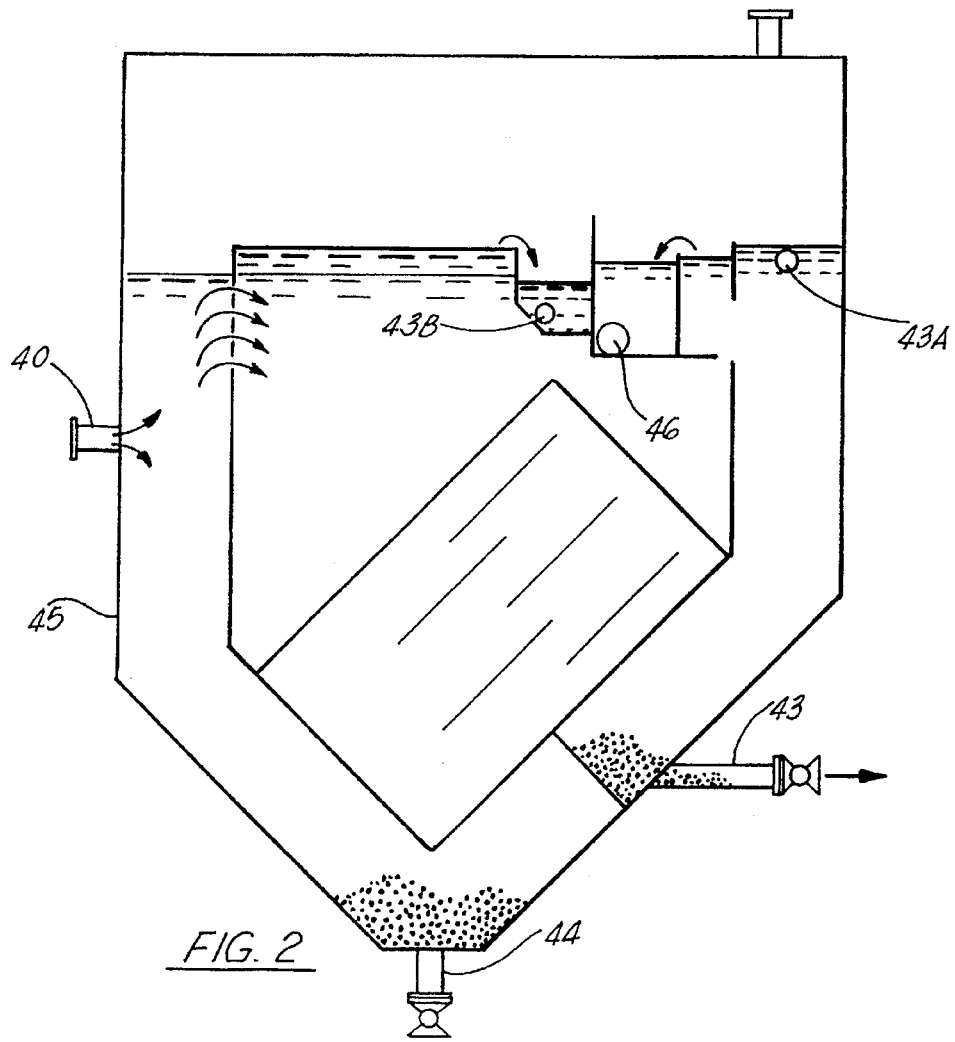
FIG. 2 is an elevational view illustrating the settling tank portion of the preferred embodiment of the apparatus of the present invention.
Figure 3:
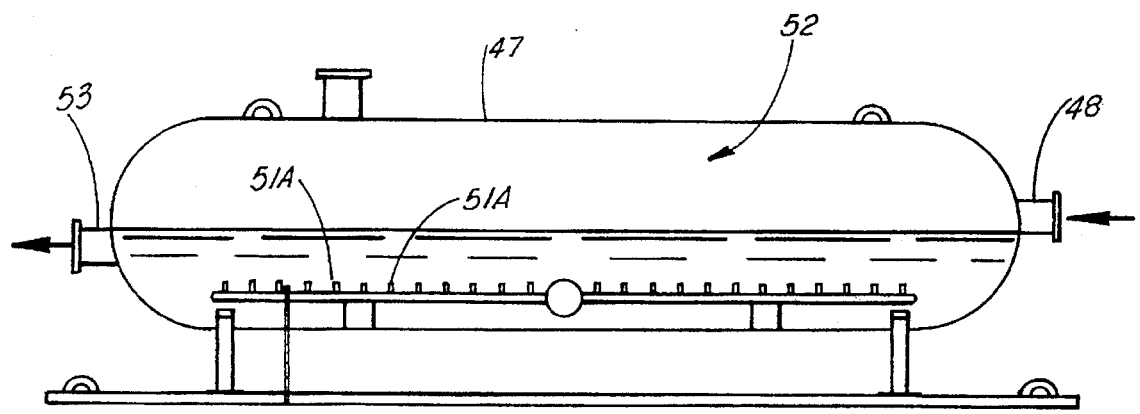
FIG. 3 is an elevational view of the aeration tank portion of the preferred embodiment of the apparatus of the present invention.

Settling tank 45 (see FIGS. 1 and 2) provides a pair of discharge lines 43, 44 for transporting floating and settleable solid waste material respectively from the vessel 45 to the sections 33–36. Line 43 can have more than one intake as shown in FIG. 2 wherein two intakes 43A–43B are shown. Flowline 42 can for example have multiple discharges 42A–42B for example via line 43 in order to distribute solid material via line 44 or floating waste material to the desired section 33–36 of receiving barge 28 as desired. Separator apparatus such as 45 are commercially available for separating a waste water stream into the three components of settleable solids, floating solids, and clarified water.

Discharge line 46 carries supernatant fluid from settling tank 45 to aeration tank 47. The flowline 46 enters aeration tank 47 at inlet fitting 48. A blower 49 communicates via flowline 50 with aerator header 51. The header 51 provides multiple diffuser outlets 51A through which air can be pumped into the interior 52 of vessel 47. At the aeration tank 47, aeration and adjuration within the tank oxidizes any remaining waste and rejuvenates the laundered wash water through the use of the multiple aeration diffusers 51A that are a part of a header 51. From the adjuration and aeration tank 47 the laundered water is returned to the wash water storage facility 14 via flowlines 53–55. In FIG. 1, the flow line 53 is a suction flowline for communicating with pump 54. The line 55 is a discharge line that communicates between pump 54 and storage facility 14.

The following table lists the parts numbers and parts descriptions as used herein and in the drawings attached hereto.

| PARTS LIST | |
|---|---|
| Part Number | Description |
| 10 | wash water recovery system |
| 11 | body of water |
| 12 | land |
| 13 | shoreline |
| 14 | wash water storage facility |
| 15 | flowline |
| 16 | intake |
| 17 | discharge |
| 18 | flowline |
| 19 | intake |
| 20 | discharge |
| 21 | pumping station |
| 22 | discharge line |
| 23 | vessel |
| 24 | deck area |
| 25 | pump |
| 26 | suction line |
| 27 | flowline |
| 27A | arrow |
| 28 | receiving barge |
| 29 | receiving barge outer wall |
| 30 | receiving barge inner wall |
| 31 | receiving barge inner wall |
| 32 | receiving barge inner wall |
| 33 | receiving barge compartment |
| 34 | receiving barge compartment |
| 35 | receiving barge compartment |
| 36 | receiving barge compartment |
| 37 | skimmer |
| 38 | flowline |

-continued

| PARTS LIST | |
|---|---|
| Part Number | Description |
| 39 | pump |
| 40 | flowline |
| 41 | flowline |
| 42 | flowline |
| 42A | multiple discharge |
| 42B | multiple discharge |
| 43 | discharge line |
| 44 | discharge line |
| 45 | settling tank |
| 46 | flowline |
| 47 | aeration tank |
| 48 | inlet |
| 49 | blower |
| 50 | flowline |
| 51 | header |
| 51A | diffuser |
| 52 | interior |
| 53 | flowline |
| 54 | pump |
| 55 | flowline |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of cleaning a floating vessel that has been contaminated with oil and gas well drilling fluids or hazardous waste comprising the steps of:

a) storing laundered wash water in a storage facility that is adjacent to the floating vessel to be cleaned;

b) cleaning the floating vessel with wash water transmitted to the vessel from the laundered wash water facility;

c) transmitting contaminated wash water from the floating vessel to a floating receiving barge that is floating adjacent to the vessel to be cleaned;

d) introducing a primary coagulation cationic polymer upstream of the receiving barge into the wash water in a flowline that extends between the vessel and the receiving barge;

e) settling and concentrating solid material within the receiving barge;

f) decanting supernatant wash water from the water surface area of water contained in the receiving barge after settling of solid material within the receiving barge;

g) introducing a cationic flocculent into the decant supernatant wash water from step "f" in a flowline that extends between the receiving barge and a settling tank that is downstream of the vessel and receiving vessel;

h) removing solid material from the wash water in the settling tank;

i) transmitting solid material from the settling tank to the receiving barge to concentrate solid material within the receiving vessel;

j) transmitting wash water from the settling tank to an aeration tank wherein the wash water is aerated to oxidize waste material contained within the wash water;

k) returning wash water that has been laundered in steps "b" through "j" to the water storage facility; and l) using at least some of the wash water returned in step "k" to again clean a vessel that has been contaminated with oil and gas well drilling fluids or hazardous waste.

2. The method of claim 1 wherein "c" comprises transmitting contaminated wash water from the floating vessel to a floating receiving barge that contains a plurality of separate holding tanks for separating fluid contained within the vessel.

3. The method of claim 1 wherein in step "f" decanting is accomplished by pumping.

4. The method of claim 1 wherein in step "d" the contaminated wash water is transmitted to a barge with multiple tanks and further comprising the step of transferring contaminated wash water from one tank to another tank in order to selectively balance the volume of solids that accumulate in each tank.

5. The method of claim 1 furthering comprising the step of removing fumes from the waste water stream after step "j".

6. The method of claim 5 wherein the removing of fumes includes the step of aerating the waste stream.

* * * * *